US011515980B1

(12) United States Patent
Zhang (10) Patent No.: US 11,515,980 B1
(45) Date of Patent: Nov. 29, 2022

(54) POSITIONING METHOD, MOBILE TERMINAL AND POSITIONING SYSTEM (71) Applicant: BlueWave Technology (Shanghai) Co., Ltd, Shanghai (CN)

(72) Inventor: Zhenrui Zhang, Shanghai (CN)

(73) Assignee: BlueWave Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 17/839,687

(22) Filed: Jun. 14, 2022

Related U.S. Application Data (63) Continuation of application No. PCT/CN2022/096804, filed on Jun. 2, 2022.

(30) Foreign Application Priority Data

Dec. 14, 2021 (CN) .......................... 202111518996.1

(51) Int. Cl.
H04L 5/00 (2006.01)
H04W 72/04 (2009.01)
H04W 56/00 (2009.01)

(52) U.S. Cl.
CPC ......... *H04L 5/0048* (2013.01); *H04W 72/044* (2013.01); *H04W 56/001* (2013.01)

(58) Field of Classification Search
CPC .. H04L 5/0048; H04W 72/044; H04W 56/001
See application file for complete search history.

(56) References Cited

U.S. PATENT DOCUMENTS

2010/0317343 A1 12/2010 Krishnamurthy et al.
2014/0106774 A1* 4/2014 Siomina ................ H04W 64/00
455/456.1

(Continued)

FOREIGN PATENT DOCUMENTS

CN 102461015 A 5/2012
CN 106714100 A 5/2017
CN 111865524 A 10/2020

OTHER PUBLICATIONS

First Office Action issued in counterpart Chinese Patent Application No. 202111518996.1, dated Jan. 19, 2022.

(Continued)

*Primary Examiner* — Maharishi V Khirodhar
*Assistant Examiner* — Kenneth P Hunt
(74) *Attorney, Agent, or Firm* — Westbridge IP LLC (57) ABSTRACT Disclosed is a positioning method, including: synchronizing, by a mobile terminal, with a network device according to preset configuration information; acquiring, from the configuration information, parameters for determining a time-frequency resource of a sounding reference signal (SRS); determining the time-frequency resource for sending the SRS, and sending, on the determined time-frequency resource, the SRS to a plurality of network devices; receiving, by each of the plurality of network devices, the SRS, determining an arrival time of the SRS and the time-frequency resource occupied, determining, according to the time-frequency resource occupied by the SRS, an identifier of the mobile terminal sending the SRS, and reporting the identifier to a location server; and determining, by the location server, a position of the mobile terminal sending the above SRS according to the arrival time of the SRS.

17 Claims, 3 Drawing Sheets (56) References Cited

U.S. PATENT DOCUMENTS

| | | | |
|---|---|---|---|
| 2018/0242101 A1* | 8/2018 | Lin | H04W 4/02 |
| 2019/0098541 A1* | 3/2019 | Peng | H04W 36/0083 |
| 2022/0201646 A1* | 6/2022 | Berggren | H04W 12/037 |

OTHER PUBLICATIONS

Second Office Action issued in counterpart Chinese Patent Application No. 202111518996.1, dated Feb. 2, 2022.

* cited by examiner

POSITIONING METHOD, MOBILE TERMINAL AND POSITIONING SYSTEM

CROSS-REFERENCE TO RELATED APPLICATIONS

The present application is a continuation of International Application PCT/CN2022/096804, entitled "Positioning Method, Mobile Terminal and Positioning System", filed on Jun. 2, 2022, which claims priority to Chinese Patent Application CN202111518996.1, filed on Dec. 14, 2021, the entire contents of which are incorporated herein by reference.

TECHNICAL FIELD

The present disclosure relates to the technical field of communications, and in particular to a positioning method, a mobile terminal and a positioning system.

BACKGROUND

In a new radio (NR) or a long-term evolution (LTE) system, a downlink positioning reference signal (PRS) and an uplink sounding reference signal (SRS) for positioning are newly defined to support a positioning measurement for a mobile terminal within an area covered by the system.

However, for campuses with relatively large areas such as ports, factory parks, office parks or large amusement parks, when articles, devices or persons at these campuses are required to be located, on the one hand, positions of the articles, devices or persons at the campuses cannot be directly acquired via an operator of an existing mobile communication system; on the other hand, if mobile terminals for positioning are issued at the campuses to track the positions of the devices, articles and persons, problems have to be considered of a cost, power consumption and portability of the mobile terminals for positioning. Nevertheless, the existing mobile terminals either do not support a positioning function, or cannot meet a requirement on the above cost, power consumption and portability.

SUMMARY

In view of the above, examples of the present disclosure provide a positioning method, a mobile terminal and a positioning system.

The positioning method provided by some examples of the present disclosure may include: generating, according to configuration parameters of a plurality of network devices at a campus in advance, configuration information of each mobile terminal, and pre-storing the configuration information in a storage module of each mobile terminal; wherein the configuration information comprises: cell parameters, an identifier of each mobile terminal and parameters for determining a time-frequency resource of a sounding reference signal (SRS) corresponding to the identifier of the mobile terminal; synchronizing, by one mobile terminal, with one of the plurality of network devices according to the configuration information; acquiring the parameters for determining the time-frequency resource of the SRS from the configuration information; and determining the time-frequency resource for sending the SRS; and sending, on the time-frequency resource, the SRS to the plurality of network devices; receiving, by each of the plurality of network devices, the SRS; determining an arrival time of the SRS and the time-frequency resource occupied by the SRS, determining, according to the time-frequency resource occupied by the SRS, an identifier of the mobile terminal sending the SRS, and reporting, to a location server, the arrival time of the SRS and the identifier of the mobile terminal sending the SRS; and receiving, by the location server, the arrival time of the SRS and the identifier of the mobile terminal sending the SRS from the plurality of network devices, and determining a position of the mobile terminal sending the SRS according to the arrival time of the SRS.

Examples of the present disclosure also provides a mobile terminal, comprising: a radio-frequency subsystem, a baseband subsystem and a modem control subsystem, wherein, the radio-frequency subsystem comprises: an antenna and a radio-frequency transceiver; wherein the antenna and the radio-frequency transceiver are used for receiving and transmitting a radio-frequency signal; the baseband subsystem comprises: a downlink synchronization unit, a time-frequency control logic, and a sounding reference signal (SRS) transmission unit; wherein the downlink synchronization unit is used for completing synchronization with a network device under a control of the time-frequency control logic to calculate an adjusting parameter of a frequency point and time of the radio-frequency transceiver; the SRS transmission unit is used for sending, under a control of the time-frequency control logic, an SRS via the radio-frequency subsystem; the time-frequency control logic is used for controlling a time of the downlink synchronization unit performing a simplified initial cell search flow, adjusting a frequency and time deviation of the mobile terminal and control the time-frequency resource for sending the SRS according to an output of the downlink synchronization unit; wherein, each of a plurality of network devices receives the SRS, determines an arrival time of the SRS and the time-frequency resource occupied by the SRS, determines, according to the time-frequency resource occupied by the SRS, an identifier of the mobile terminal sending the SRS, and reports, to a location server, the arrival time of the SRS and the identifier of the mobile terminal sending the SRS; and the location server receives the arrival time of the SRS and the identifier of the mobile terminal sending the SRS from the plurality of network devices, and determines a position of the mobile terminal sending the SRS according to the arrival time of the SRS; the modem control subsystem comprises: a storage module, a control unit and a clock unit, wherein the storage module is used for storing configuration information of the mobile terminal and a control logic for the control unit; the control unit is used for controlling operation of the baseband subsystem; and the clock unit is used for managing a local clock; wherein, the configuration information of each mobile terminal is generated according to configuration parameters of the plurality of network devices at a campus in advance and the configuration information comprises: cell parameters, an identifier of each mobile terminal and parameters for determining a time-frequency resource of the SRS corresponding to the identifier of the mobile terminal.

Based on the above positioning method and mobile terminal, examples of the present disclosure provides a positioning system, which includes: at least one mobile terminal, a plurality of network devices and a location server connected to the plurality of network devices, wherein each of the plurality of network devices is to receive an SRS, determine an arrival time of the SRS, determine, according to a time-frequency resource occupied by the SRS, an identifier of the mobile terminal sending the SRS, and reporting, to the location server, the arrival time of the SRS and the identifier of the mobile terminal sending the SRS; the location server is to receive the arrival time of each SRS and the identifier of the mobile terminal sending the SRS from the plurality of network devices, and determining a position of the mobile terminal sending the above SRS according to the arrival time of a certain SRS reaching the different network devices.

It can be seen that, according to the above positioning method, the mobile terminal and the positioning system, the mobile terminal does not need to perform any access process and the network devices do not need to perform dynamic configuration for transmission resources of the SRS, while the mobile terminal only needs to receive a system synchronization block (SSB), complete synchronization with the network devices according to the SSB, and then complete the transmission of the SRS according to the pre-stored configuration information, thereby completing, by the network devices and the location server, the positioning of the mobile terminal. In some examples, the mobile terminal even does not need to demodulate the SSB, and can even complete the transmission of the SRS without obtaining a system frame number (SFN) of a current SSB. That is, the mobile terminal neither needs an existing protocol stack system, nor needs to maintain a plurality of connection statuses of the mobile terminal. In addition, because all network device side information is pre-configured, a synchronization flow of a cell search on a mobile terminal physical layer is extremely simplified, no random-access process is required to acquire a time advance, and downlink processing of the mobile terminal physical layer may even not need to complete any demodulation. In such a case, the cost and power consumption of the mobile terminal can be greatly reduced, and portability thereof can be greatly improved. The positioning method, the mobile terminal and the positioning system of the present disclosure can even support a disposable device.

BRIEF DESCRIPTION OF THE DRAWINGS

In order to describe the technical solutions in the present disclosure or the related art more clearly, the following briefly introduces the accompanying drawings required for describing the examples or the related art. Apparently, the accompanying drawings in the following descriptions are only some examples of the present disclosure, and those of ordinary skill in the art may still derive other drawings from these drawings without creative efforts.

DETAILED DESCRIPTION OF THE EMBODIMENTS

To make the objectives, technical solutions and advantages of the present disclosure clearer, the present disclosure will be further described in detail below in conjunction with specific examples and with reference to the accompanying drawings.

It should be noted that, unless otherwise defined, technical terms or scientific terms used in the examples of the present disclosure should have the ordinary meanings as understood by those of ordinary skill in the art to which the present disclosure belongs. The terms "first", "second" and similar words used in the examples of the present disclosure do not denote any order, quantity, or importance, but are merely used to distinguish different components. The terms "including" or "comprising" and the like are intended to indicate that elements or objects in front of the word encompass elements or objects listed after the word and their equivalents, but do not exclude another element or object. Similar terms such as "connected" or "linked" are not limited to physical or mechanical connections, but may include electrical connections, whether direct or indirect. The terms "upper", "lower", "left", "right" and the like are only used to represent a relative positional relationship, and when an absolute position of a described object changes, the relative positional relationship may also change accordingly.

As described above, in the NR system or the LTE system, the downlink PRS and the uplink SRS have been defined to achieve the positioning measurement for a mobile terminal within the area covered by the system. However, for campuses with relatively large areas such as ports, factory parks, office parks or large amusement parks, when articles, devices or persons at the campuses are required to be located, an existing mobile communication system has a plurality of problems whether in feasibility or in a cost, power consumption and portability of the terminal side.

In view of this, the examples of the present disclosure provide a positioning system and a positioning method, which may make positioning of the articles, devices or persons at the campuses with relatively large areas such as ports, factory parks, office parks or large amusement parks easier. In addition, the positioning system and the positioning method provided by the examples of the present disclosure have a very simplified positioning flow, so assemblies can be greatly simplified which are required for forming a mobile terminal for positioning in the positioning system, so that the objects can be achieved of reducing the cost of the mobile terminal, reducing the power consumption thereof and improving the portability thereof.

Figure 1:
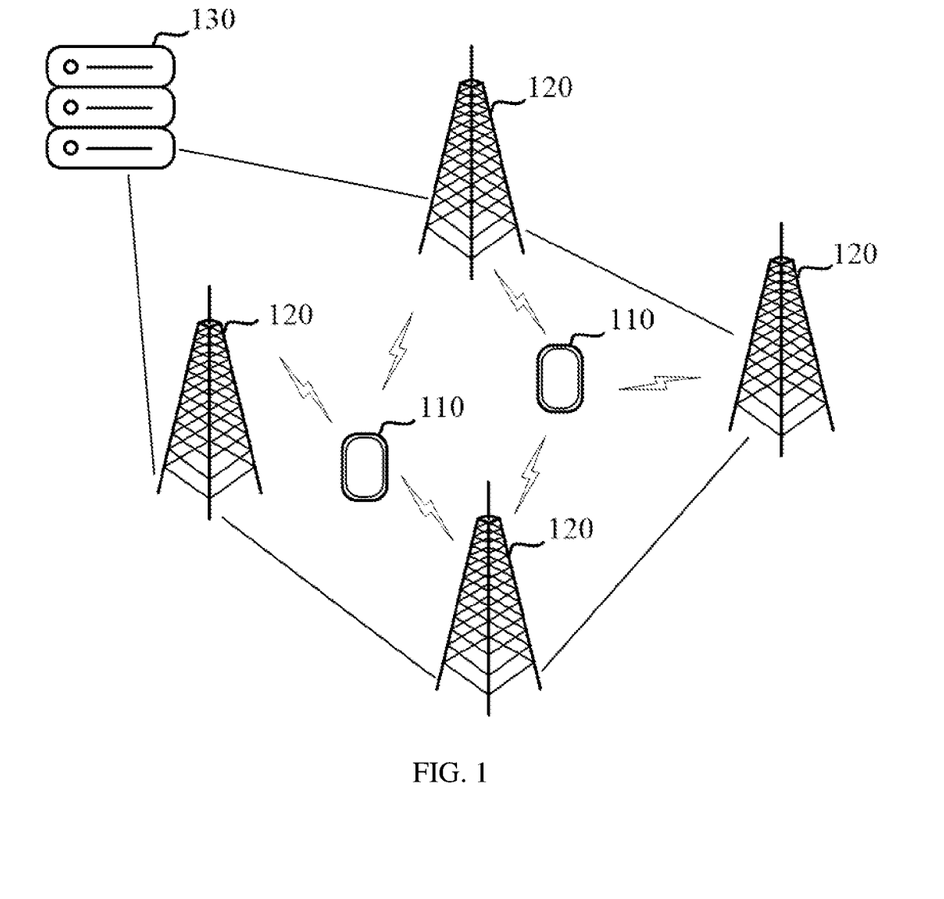
FIG. 1 shows an internal structure of a positioning system described in some examples of the present disclosure.

FIG. 1 shows a structure of a positioning system 100 described in some examples of the present disclosure. As shown in FIG. 1, the positioning system 100 described in the examples of the present disclosure may include: at least one mobile terminal 110 to be located (hereinafter referred to as the mobile terminal 110), a plurality of network devices 120 and a location server 130 connected to the above plurality of network devices 120. To achieve positioning of the at least one mobile terminal 110, the quantity of the above network devices 120 usually needs to be three or more.

In the examples of the present disclosure, the above mobile terminal 110 is a mobile terminal for positioning, usually has features of miniaturization, low power consumption, low cost and high portability. It is preferred that the mobile terminal 110 can be adhered to surfaces of goods or articles, can be carried by persons, and can even support a disposable device, so as to achieve positioning of the goods or articles to which it adheres or the persons carrying same. A main function of the above mobile terminal 110 is to be used for synchronizing with the network devices 120 in the system according to its own preset configuration information after being turned on, then determining time-frequency resources for sending an SRS according to the above configuration information, and sending, on the determined time-frequency resources, an uplink SRS to the above network devices 120, so that the network devices 120 and the location server 130 can locate the mobile terminal 110 according to these uplink SRSs.

In some examples of the present disclosure, the above network devices 120 may be an electronic device capable of performing wireless communication with the above mobile terminal 110, and have a main function of receiving the SRS, determining an arrival time of the SRS, determining an identifier of the mobile terminal 110 sending the SRS according to the time-frequency resource occupied by the SRS, and reporting, to the location server 130, the arrival time of the SRS and the identifier of the mobile terminal 110 sending the SRS, so that the location server 130 can determine a position of each mobile terminal 110 according to the arrival time of each SRS.

Specifically, the above network devices 120 can be achieved by a network side device in an existing mobile communication system. For example, the above network devices 120 may be an evolved Node B (eNB or eNodeB) in an LTE system and a remote radio-frequency unit thereof. The above network devices 120 may further be a wireless controller in a scenario of a cloud radio access network (CRAN). Or the network devices 120 may still be network devices in a relay station, an access point, a transmission and receiving point (TRP), a future mobile communication network or the like, which is not limited by the examples of the present disclosure. As an alternative, the above network devices 120 may even be a plurality of network devices specially for positioning disposed at different positions at a campus.

In some examples of the present disclosure, the location server 130 may be a computing device with a certain computing processing capability, and a main function thereof is to be used for receiving the arrival time of each SRS and the identifier of the mobile terminal 110 sending the SRS from the plurality of network devices 120, and determining the position of the mobile terminal 110 sending the above SRS according to the arrival time of a certain SRS reaching the different network devices 120.

Specifically, the above location server 130 may be achieved by a location management function (LMF) network element or another network entity. As an alternative, the above location server 130 may also be a computing device specially for positioning disposed at the campus.

A positioning process of positioning the mobile terminal 110 in the system by means of the positioning system 100 is described in detail below in conjunction with the accompanying drawings.

Figure 2:
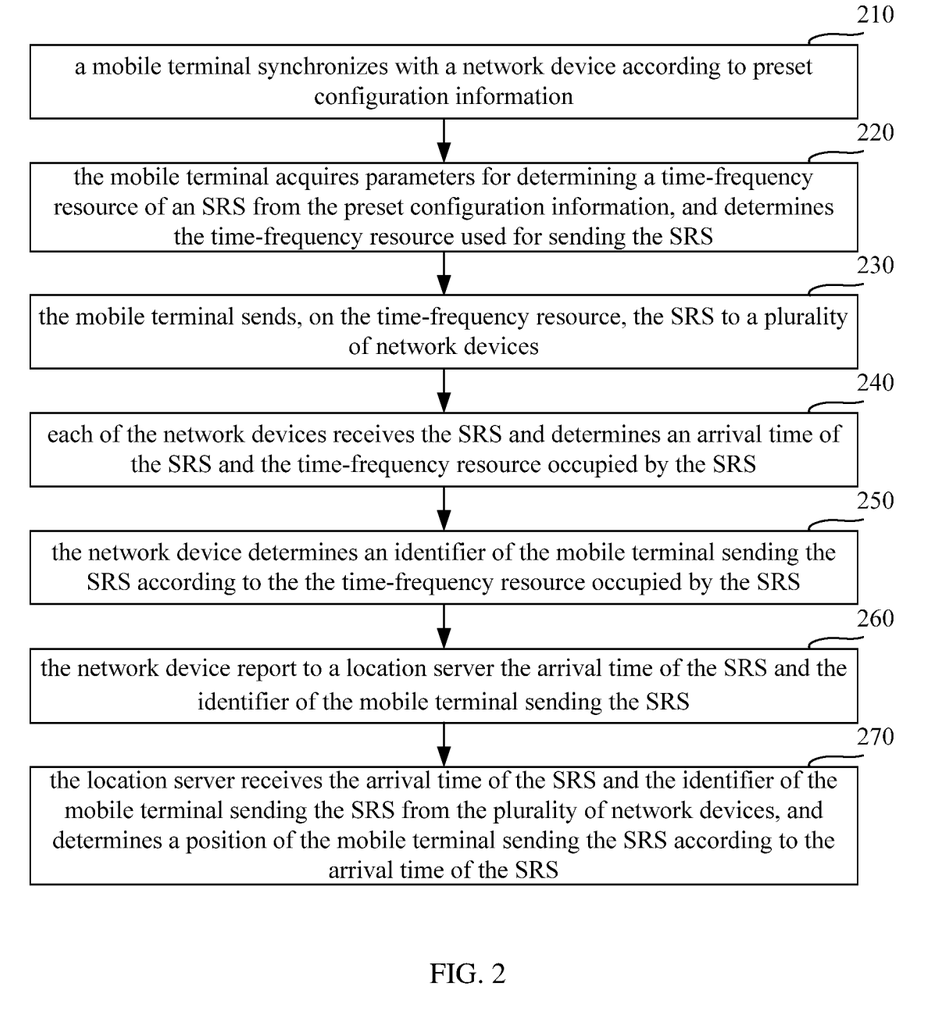
FIG. 2 is a flowchart of a positioning method according to some examples of the present disclosure.

FIG. 2 shows an implementation flow of a positioning method described in some examples of the present disclosure. As shown in FIG. 2, the positioning method mainly includes:

In step 210, a mobile terminal 110 synchronizes with a network device 120 according to its own preset configuration information.

In some examples of the present disclosure, before the above positioning method is implemented, it is required to generate configuration information of each mobile terminal 110 respectively in advance according to configuration parameters of network devices at the campus, and pre-store the configuration information in a storage module in each mobile terminal 110. Specifically, generation of the above configuration parameters and a configuration process can be achieved by the above location server 130. In the examples of the present disclosure, the above configuration information may include: cell parameters, an identifier of the mobile terminal and parameters for determining a time-frequency resource of an SRS and corresponding to the above identifier of the mobile terminal. Specifically, the above cell parameters may include: a frequency point of a cell at the campus, an identifier of the cell and other parameters. The above parameters for determining the time-frequency resource of the SRS includes: an SFN, a subframe, a slot, a symbol and a frequency of sending the SRS. In other examples of the present disclosure, the above parameters for determining the time-frequency resource of the SRS may include the subframe, the slot, the symbol and the frequency, excluding the SFN. In such a case, regardless of power consumption of the mobile terminal 110, the mobile terminal 110 can be set to send the SRS on the time-frequency resource distributed thereto within each SSB period. To reduce the power consumption of the mobile terminal 110, in a practical application, the mobile terminal 110 is usually not required to send the SRS in each SSB period, so the above configuration information can be further provided with: an interframe space for determining how many SSB periods as an interval for the mobile terminal 110 to send the SRS once.

By means of the above parameters for determining the time-frequency resource of the SRS, the specific SSB period and the specific subframe, slot, symbol and frequency in the SSB period within and on which the mobile terminal 110 can send the SRS can be determined, and the resource block (RB) for sending the SRS can also be determined.

It should be noted that, in examples of the present disclosure, to simplify the positioning flow, it is required to pre-establish a one-to-one correspondence between the time-frequency resource of sending the SRS and the identifier of the mobile terminal. In some examples, the above one-to-one correspondence may also be achieved by the location server 130. That is, each mobile terminal 110 has a predetermined time-frequency resource for the mobile terminal 110 to send an SRS, and has parameters pre-stored in the storage module of the mobile terminal 110 which are used for determining the time-frequency resource of the SRS. In the examples of the present disclosure, an establishing method will be described in detail below for the above one-to-one correspondence between the time-frequency resource of the SRS and the identifier of the mobile terminal.

After completing the above pre-configuration operations, and after the mobile terminal 110 is turned on, specifically, the following steps can be sequentially implemented to complete the synchronization with the network device 120.

First, the mobile terminal 110 can acquire cell parameters of a current cell from the configuration information stored in a storage module thereof, such as a frequency point of the cell, an identifier of the cell and other parameters.

Then, the mobile terminal 110 executes a simplified initial cell search flow according to the acquired cell parameters, and obtains downlink synchronization information by means of a downlink synchronization signal issued by the network device 120. It should be noted that, because the configuration information pre-stored in the mobile terminal 110 has included the cell parameters, for example, the frequency point of the cell and the identifier of the cell, the above initial cell search flow may be a very simplified cell search flow which only needs to search the SSB according to the above cell parameters configured, and there is no need to perform a signal blind detection in each frequency band.

Finally, the mobile terminal 110 adjusts a current frequency shift and timing parameters of its own according to the acquired downlink synchronization information to complete the synchronization with the network device 120.

Specifically, in examples of the present disclosure, the above downlink synchronization information may include: a primary synchronization signal (PSS) and a secondary synchronization signal (SSS). In a practical application, the network device 120 may send the above PSS and SSS on a fixed time-frequency resource within one SSB period. In this way, the mobile terminal 110 can determine, by means of a signal detection, a position of the time-frequency resource where the above PSS and SSS are located, then can determine a slot boundary and a frame boundary of the SSB, and can adjust the current frequency shift and timing parameters of its own with the information as a standard.

As can be seen, in the above step, by means of pre-storing in the storage module of the mobile terminal 110 the cell parameters of the current cell, the mobile terminal 110 can directly execute the simplified initial cell search flow on the preset frequency point according to the cell parameters stored therein and according to the known identifier of the cell. Therefore, there is no need to perform the signal blind detection on each frequency band, so that the process of the initial cell search can be greatly accelerated, and at the same time, the operation flow of the mobile terminal 110 can be simplified, thereby reaching the object of reducing a cost and power consumption of the mobile terminal 110.

In step 220, the mobile terminal 110 acquires parameters for determining a time-frequency resource of an SRS from its own preset configuration information, and determines the time-frequency resource for sending the SRS.

As described above, in some examples of the present disclosure, the above parameters for determining the time-frequency resource of the SRS may include the SFN, the subframe, the slot, the symbol and the frequency. In these examples, the quantity of the mobile terminals 110 supported by the positioning system 100 may be relatively large. In other examples of the present disclosure, the above parameters for determining the time-frequency resource of the SRS may include the subframe, the slot, the symbol and the frequency, while may not include the SFN. The above parameters for determining the time-frequency resource of the SRS may further include an interframe space. In these examples, the quantity of the mobile terminals 110 supported by the positioning system 100 is relatively small.

In addition, it should be noted that, in the examples of the present disclosure, the frequency in the above parameters is determined by a frequency mapping mode, and the frequency mapping mode can follow regulations of a fifth-generation mobile communication (5G) protocol or a fourth-generation mobile communication (4G) protocol, and can also be adjusted according to the quantity of the mobile terminals to be supported by the campus. For example, when the quantity of the mobile terminals to be supported is relatively small, the above frequency mapping mode can be set as COMB-2, that is, two mobile terminals share a same time domain resource in a frequency division multiplexing manner; when the quantity of the mobile terminals to be supported is relatively large, the above frequency mapping mode can be set as COMB-4, that is, four mobile terminals share a same time domain resource in a frequency division multiplexing manner. The frequency in the above parameters refers to specifically mapping an SRS on which frequency according to the preset frequency mapping mode, thereby finally determining to send the SRS by specifically occupying which RB.

In the above step, because the configuration information pre-stored in the storage module of the mobile terminal 110 has included the parameters for determining the time-frequency resource of the SRS, the mobile terminal 110, after being turned on, can directly acquire the parameters for determining the time-frequency resource of the SRS from the configuration information, and determine the time-frequency resource for sending thereby the SRS. The above time-frequency resource for sending the SRS can include the SFN, the subframe, the slot, the symbol and the frequency that are occupied by the above SRS, and the specific SSB, subframe, slot, symbol and frequency on which the SRS is sent can be determined.

As can be seen, in the above step, by means of pre-storing in the storage module of the mobile terminal 110 the parameters for determining the time-frequency resource of the SRS, the network device 120 does not need to dynamically configure the time-frequency resource of each mobile terminal 110 sending the SRS, and each mobile terminal 110 does not need to dynamically determine the time-frequency resource in sending thereby the SRS according to an instruction issued by the network device 120, so that a configuration flow of sending the time-frequency resource of the SRS is greatly simplified, thereby further reducing the operation flow, cost and power consumption of the mobile terminal 110 and the network device 120.

In step 230, the mobile terminal 110 sends, on the determined time-frequency resource, the SRS to a plurality of network devices 120.

Specifically, in some examples of the present disclosure, when the acquired parameters for determining the time-frequency resource of the SRS include the SFN, the subframe, the slot, the symbol and the frequency, then the mobile terminal 110 should send an uplink SRS on the acquired SFN, subframe, slot, symbol and frequency. In such a case, because the above parameters for determining the time-frequency resource of the SRS include the SFN, before the mobile terminal 110 sends the uplink SRS, a current SFN is required to be determined, that is, the following operation should further be implemented: the mobile terminal 110 demodulates a physical broadcast channel (PBCH) in a received SSB to acquire the current SFN. After the current SFN is acquired, the mobile terminal 110 can determine a moment of sending the SRS for the first time according to the acquired parameters for determining the time-frequency resource of the SRS, and a first waiting slot from a current moment to the moment of sending the SRS for the first time. In addition, because the SRS is usually sent periodically, after the first transmission of the SRS is completed, the mobile terminal 110 can continue to determine a next moment of sending the SRS according to the above parameters for determining the time-frequency resource of the SRS, and to determine a second waiting slot between the two signal sending moments.

In some examples of the present disclosure, to further reduce the power consumption of the mobile terminal 110, when it is found that the first waiting slot or the second waiting slot is greater than a preset threshold, for example, 128 milliseconds or other preset values, it can be considered to control the mobile terminal 110 to enter a sleep state, and before the moment of sending the SRS comes, the mobile terminal 110 can be awaken to enter an activated state. Furthermore, every time the transmission of the SRS is completed, the mobile terminal 110 can enter the sleep state, and before the moment of sending a next SRS comes, the mobile terminal 110 can be awaken to enter the activated state.

In other examples of the present disclosure, when the acquired parameters for determining the time-frequency resource of the SRS only include the subframe, the slot, the symbol and the frequency while excluding the SFN, then the mobile terminal 110 can send the uplink SRS within each SSB period or with one of the SSB periods periodically every several SSB periods according to the acquired subframe, slot, symbol and frequency.

In these examples, the mobile terminal 110 can determine the next moment of sending the SRS according to the above parameters for determining the time-frequency resource of the SRS, and the waiting slot between the two signal sending moments. In this way, every time the transmission of the SRS is completed, the mobile terminal 110 can also enter the sleep state, and before the moment of sending the next SRS comes, the mobile terminal 110 can be awaken to enter the activated state, so that the power consumption of the mobile terminal 110 is further reduced.

In the examples of the present disclosure, the mobile terminal 110 may maintain a timer for recording a local time, so after the above step 210 is implemented and the mobile terminal 110 synchronizes with the network devices 120, the mobile terminal 110 can determine each following moment of sending the SRS according to the time recorded by the timer of its own, instead of repeating the above synchronization with the network devices 120. Furthermore, in the foregoing examples, when the SFN is required to be acquired, after the mobile terminal 110 determines the current SFN by means of demodulating the SSB for the first time, a following SFN can be maintained by the mobile terminal 110, instead of repeating the synchronization and the demodulation of the SSB to acquire the current SFN, so that the cost and power consumption of the mobile terminal 110 can be further reduced.

To further simplify the operation flow of the mobile terminal 110, and reduce the cost of the mobile terminal 110, a basic sequence of the above SRS may be preset data and does not need dynamic generation by the mobile terminal 110.

In step 240, the network devices 120 receive the SRS and determine an arrival time of the SRS and the time-frequency resource occupied thereby.

In some examples of the present disclosure, the arrival time of the above SRS is a time of the network devices 120 receiving the above SRS. Specifically, the above time of receiving the SRS may be an absolute time representing a specific time, or may be a relative time to a standard time.

In some examples of the present disclosure, the time-frequency resource occupied by the above SRS can include the SFN, the subframe, the slot, the symbol and the frequency that are occupied by the above SRS.

In step 250, the network devices 120 determine an identifier of the mobile terminal 110 sending the above SRS according to the resource occupied by the SRS.

As described above, the one-to-one correspondence is pre-established between the time-frequency resource of the SRS and the identifier of the mobile terminal, and in some examples of the present disclosure, the above one-to-one correspondence may be pre-stored in the storage module of each network device. In such a case, in the above step 250, the network devices 120 can determine the identifier of the mobile terminal sending the above SRS according to the time-frequency resource occupied by the above SRS and the one-to-one correspondence between the time-frequency resource of the SRS and the identifier of the mobile terminal 110.

Because the network devices 120 determine that the received SRS is from which mobile terminal 110 only according to a position of the SRS in an SSB period, in a case where the mobile terminal 110 does not send the SRS at each SSB period, if the network devices 120 do not detect an effective signal on a certain time-frequency resource, the operations in the above steps 240 and 250 may not be implemented.

In step 260, the network devices 120 report to the location server 130 the arrival time of the SRS and the identifier of the mobile terminal 110 sending the SRS.

It should be noted that, in the examples of the present disclosure, the above steps 240 to 260 may be steps that can be separately and independently executed by the plurality of network devices 120.

In step 270, the location server 130 receives, from the plurality of network devices 120, the arrival time of the SRS and the identifier of the mobile terminal 110 sending the SRS, and determines a position of the mobile terminal 110 sending the above SRS according to the arrival time of the SRS.

In some examples of the present disclosure, after receiving from the plurality of network devices 120 the arrival time of the SRS and the identifier of the mobile terminal 110 sending the above SRS, the above location server 130 may determine a time difference of a same SRS reaching different network devices 120, and then determine the position of the mobile terminal 110 sending the above SRS according to the determined time difference and an actual position of each network device 120.

Because the time difference of the same SRS reaching the different network devices 120 is proportional to a distance between the mobile 110 sending the SRS and the different network devices 120, after the time difference is determined of the same SRS reaching the different network devices 120, the actual position of these network devices 120 and the above time difference can be used to determine the position of the mobile terminal 110 sending the SRS. For a specific position computing method, a positioning computing method like a hyperbolic equation can be used, and no limitation is made herein.

In addition, in some examples of the present disclosure, according to an actual requirement of the above positioning system 100 on a positioning precision, a bandwidth used by the SRS in the above positioning method can also be adjusted. Particularly, the positioning precision is proportional to the bandwidth that can be used by the SRS, that is, the wider the bandwidth that can be used by the SRS is, the higher the positioning precision is. In such a case, to maximize the positioning precision, the bandwidth used by the SRS can be configured as an uplink maximum bandwidth supported by the positioning system. For example, the bandwidth used by the SRS can be configured as 100 MHz according to a 5G standard. When the above positioning method is applied to a system with a higher uplink bandwidth, such as a millimeter wave system, configuration can be made according to the uplink maximum bandwidth of the applied system.

As can be seen from the positioning method shown in above FIG. 2, in the above flow, the mobile terminal 110, except receiving the SSB, executes no access flow, so the operation of the mobile terminal 110 is greatly simplified, and the cost of the mobile terminal 110 is greatly reduced.

In another aspect, because the mobile terminal 110 executes no access flow, the mobile terminal 110 cannot precisely learn a time advance (TA) required when sending the SRS. When the mobile terminal 110 uses an inaccurate TA, a symbol window where the SRS is located may easily be exceeded when the SRS is sent, where on the one hand, a risk may exist that the network devices 120 cannot detect the SRS, and on the other hand, an inter-symbol interference (ISI) may be introduced when the network devices 120 receive the symbol of the SRS, so that the positioning precision may be affected. In view of this, some examples of the present disclosure, on the basis of the positioning method shown in the above FIG. 2, further provide a method for avoiding the ISI caused by inaccurate estimation of the TA.

First, the basic sequence of the SRS may be lengthened to handle the problem caused by inaccurate estimation of the TA, the basic sequence of the SRS may exceed the symbol window where the SRS is located so that the network devices 120 cannot detect the SRS. As described above, the basic sequence of the above SRS may be preset data and does not need dynamic generation by the mobile terminal 110. In some examples of the present disclosure, a cyclic prefix (CP) in the basic sequence of the SRS can be lengthened, for example, an entire length of the basic sequence of the SRS can be increased to be a sum of a length of an orthogonal frequency-division multiplexing (OFDM) symbol and a maximum time advance (TAmax) preset by the system. That is, the basic sequence of the above SRS is set to be the CP with a length of the above maximum TA (TAmax) plus a preset sequence with a length of one OFDM symbol.

Second, to solve the problem of the ISI caused by inaccurate estimation of the TA, part of the time-frequency resource of the SRS can be kept at intervals on a time domain from being used for transmitting the SRS, but as time domain protection intervals. As described above, in the above positioning method, the one-to-one correspondence needs to be pre-established between the time-frequency resource of the SRS and the identifier of the mobile terminal. In the above example, when the one-to-one correspondence is established, part of the time-frequency resource of the SRS can be selected at intervals on the time domain to establish the one-to-one correspondence with the identifier of the mobile terminal, while the rest of the time-frequency resource of the SRS which is not selected may be kept from being used for transmitting the SRS. For example, each time-frequency resource of the SRS can be numbered on the time domain (in units of symbols), and only a time-frequency resource of the SRS with an even number is selected to establish the one-to-one correspondence with the identifier of the mobile terminal, and in this way, a time-frequency resource of the SRS with an odd number may be kept from sending the SRS. Of course, to avoid loss of generality, only a time-frequency resource of the SRS with an odd number can also be selected to establish the one-to-one correspondence with the identifier of the mobile terminal. In this way, even if the transmitted SRS exceeds the symbol window where the SRS is located, because a former and a later symbol window thereof are kept and not used for transmitting the SRS, a time distance between different SRSs is greatly lengthened to effectively avoid the ISI.

After the above configuration, to ensure as much as possible that the transmitted SRS is in the symbol window thereof, the mobile terminal 110 still can estimate an estimation of the TA (TAe) according to the cell parameters stored therein and a path loss. Then, data with a length of one OFDM symbol is intercepted, starting from the TAe-th data in the above lengthened basic sequence of the SRS, as the target sequence of the SRS to be sent.

Particularly, in some examples of the present disclosure, the above value-selection criterion for the TAe can use but is not limited to the method exemplified herein to ensure that a base station can receive the SRS signal sent by the terminal: an estimated minimum possible value, estimated average, or the like can be used.

In addition, a transmission power of the SRS can still be estimated with reference to the path loss, which is not limited by the present disclosure.

Figure 3:
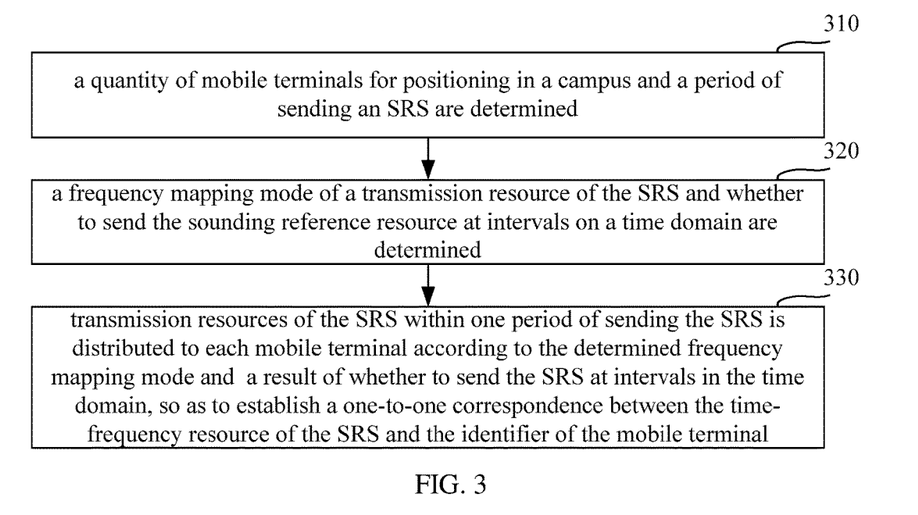
FIG. 3 shows a flow of a method for establishing a one-to-one correspondence between a time-frequency resource of an SRS and an identifier of a mobile terminal described in some examples of the present disclosure.

A method for establishing the one-to-one correspondence between the time-frequency resource of the SRS and the identifier of the mobile terminal 110 is described in detail below. FIG. 3 shows a flow of a method for establishing a one-to-one correspondence between a time-frequency resource of an SRS and an identifier of a mobile terminal described in some examples of the present disclosure. As shown in FIG. 3, the above method includes the following steps:

In step 310, a quantity of mobile terminals 110 in a campus and a period of sending the SRS are determined.

In some examples of the present disclosure, the quantity of the mobile terminals 110 in the campus can be pre-estimated, and then the period of sending the SRS can be determined according to the quantity of the mobile terminals 110 in the campus. This method is suitable for a case where the quantity of the mobile terminals 110 in the campus is relatively large.

Because the maximum of one SSB period is 160 milliseconds (ms), a period of each subframe of the SSB is 1 ms, where each subframe includes two slots, and each slot includes 14 symbols. According to a difference of a frequency mapping mode, SRSs of two mobile terminals or four mobile terminals can be simultaneously multiplexed on a same symbol, and according to the above information, a quantity can be determined of the time-frequency resources of the SRS included in one subframe. For example, when the frequency mapping mode is COMB-4, the quantity of the time-frequency resources of the SRS included in one subframe=2*14*4=112. In such a case, when the above method is used that the SRS is sent at intervals on a time domain, the quantity of the time-frequency resources of the SRS included in one subframe is 56. When the frequency mapping mode is COMB-2, the quantity of the time-frequency resources of the SRS included in one subframe=2*14*2=56. In such a case, when the above method is used that the SRS is sent at intervals on the time domain, the quantity of the time-frequency resources of the SRS included in one subframe is 28.

Next, a quantity can be determined of the subframes required by all the mobile terminals 110 to send the SRS once according to the pre-estimated quantity of the mobile terminals 110 for positioning used at the campus, and a suitable period of sending the SRS can be determined on the basis thereof.

For example, when the pre-estimated quantity of the mobile terminals is around 8,000 at the campus, the above method is used that the SRS is sent at intervals on the time domain, the frequency mapping mode is COMB-4, and the quantity of the subframes required by all the mobile terminals 110 to send the SRS once is around 143. In this way, the minimum of the above period of sending the SRS can even select 160 ms which is also a maximum SSB period. However, those skilled in the art may appreciate that an actual transmission period of the SRS may not be set as short as 160 ms. Instead, the period can be set as 1 second (s) or 5 s to completely meet a practical positioning need. In such a case, the above period of sending the SRS can be set according to the practical positioning need, for example, the period can be set as 1s or 5 s. Because the quantity of the mobile terminals 110 used at the campus is relatively small in such a case, the time-frequency resource included in one SSB period is enough to be distributed to all the mobile terminals 110. At this time, parameters configured for the mobile terminal 110 to determine the time-frequency resource of the SRS may not include an SFN, but may only include a subframe, a slot, a symbol and a frequency, and the mobile terminal 110 is set to send the SRS once every several SSB periods, which is an interframe space. For example, when the set period of sending the SRS is 1 s, the mobile terminal 110 can be set to send the SRS once every 6 or 7 SSB periods, that is, the interframe space is 6 or 7, and the subframe, the slot, the symbol and the frequency used by the mobile terminal 110 to send the SRS every time can be set (each transmission occupies the time-frequency resource at a same position within each of the SSB periods).

For another example, when the pre-estimated quantity of the mobile terminals is around 50,000 at the campus, the above method is used that the SRS is sent at intervals on the time domain, the frequency mapping mode is COMB-4, and the quantity of the subframes required by all the mobile terminals 110 to send the SRS once is around 893. In this way, is can be selected as the period of sending the SRS. In such a case, the time-frequency resource included in one SSB period is not enough to be distributed to all the mobile terminals 110, that is, the SSB period cannot distinguish the time-frequency resource of the SRS corresponding to each mobile terminal 110, so the parameters configured for the mobile terminal 110 to determine the time-frequency resource of the SRS should further include the SFN, besides the subframe, the slot, the symbol and the frequency. For example, one mobile terminal 110 can be configured to send the SRS at the fixed subframe, slot, symbol and frequency on an SSB with SFN mod 6 being 1. As described above, in such a case, the mobile terminal 110 further needs to demodulate the SSB to acquire a current SFN.

For yet another example, when the pre-estimated quantity of the mobile terminals is around 280,000 at the campus, the above method is used that the SRS is sent at intervals on the time domain, the frequency mapping mode is COMB-4, and the quantity of the subframes required by all the mobile terminals 110 to send the SRS once is around 5,000. In this way, 5 s can be selected as the period of sending the SRS. In such a case, the time-frequency resource included in one SSB period is not enough to be distributed to all the mobile terminals 110, that is, the SSB period cannot distinguish the time-frequency resource of the SRS corresponding to each mobile terminal 110, so the parameters configured for the mobile terminal 110 to determine the time-frequency resource of the SRS should further include the SFN, besides the subframe, the slot, the symbol and the frequency. For example, one mobile terminal 110 can be configured to send the SRS at the fixed subframe, slot, symbol and frequency on an SSB with SFN mod 32 being 1. As described above, in such a case, the mobile terminal 110 further needs to demodulate a PBCH in the SSB to acquire the current SFN.

It should be noted that, as described above, not only the quantity of the mobile terminals 110 for positioning can affect the period of sending the SRS, but also the frequency mapping mode can affect the period of sending the SRS. For example, in the above example, when the selected frequency mapping mode is COMB-2, for a same quantity of the mobile terminals, the determined period of sending the SRS may become 2 times of the original.

In some other examples of the present disclosure, the period of sending the SRS can be determined directly according to the practical need, and then the quantity of the mobile terminals 110 for positioning that can be supported at the campus can be determined according to the period of sending the SRS. Specifically, a process of determining the quantity of the mobile terminals 110 for positioning that can be supported at the campus according to the determined period of sending the SRS is similar to the previous description, where the quantity of the time-frequency resources included in one period of sending the SRS is first determined according to the determined period of sending the SRS, and then the quantity of the mobile terminals 110 for positioning that can be supported at the campus is determined according to the quantity of the time-frequency resources. For example, when the determined period of sending the SRS is 1 s, the quantity of the supported mobile terminals may be around 30 thousand to 110 thousand; and when the determined period of sending the SRS is 5 s, the quantity of the supported mobile terminals may be around 140 thousand to 560 thousand.

In still other examples of the present disclosure, the period of sending the SRS can be determined directly according to the practical positioning need, the quantity of the mobile terminals 110 for positioning used at the campus can be directly pre-estimated according to a practical case, and then according to a quantitative relationship between the two, a frequency mapping mode of the SRS, whether to send the SRS at intervals on the time domain, and the like can be determined.

In step 320, a frequency mapping mode of the SRS and whether to send the SRS at intervals on a time domain are determined.

In some examples of the present disclosure, the frequency mapping mode of the SRS and whether to send the SRS at intervals on the time domain can be determined according to the determined quantity of the mobile terminals 110 for positioning used at the campus and the period of the mobile terminal 110 sending the SRS.

Specifically, the frequency mapping mode of the SRS and whether to send the SRS at intervals on the time domain can be determined according to the quantity of the mobile terminals 110 for positioning used at the campus and a quantity of the time-frequency resources included in one period of sending the SRS. For a specific method, reference may be made to the foregoing examples, which are not repeated herein.

In step 330, the time-frequency resource of the SRS within one period of sending the SRS is distributed to each mobile terminal 110 according to the determined frequency mapping mode and based on a result of whether to send the SRS at intervals on the time domain, so as to establish the one-to-one correspondence between the time-frequency resource of the SRS and the identifier of the mobile terminal.

In some examples of the present disclosure, when the time-frequency resource included in one SSB period is enough to be distributed to all the mobile terminals 110, parameters for determining the time-frequency resource of the SRS may not include an SFN, but only include a subframe, a slot, a symbol, a frequency and an interframe space.

It can be seen that, according to the above positioning method, the mobile terminal 110 does not need to perform any access process and the network devices 120 do not need to perform dynamic configuration for the time-frequency resource of the SRS, while the mobile terminal 110 only needs to receive the SSB, complete synchronization with the network devices 120 according to the SSB, and then complete the transmission of the SRS according to the pre-stored configuration information, thereby completing, by the network devices 120 and a location server 130, the positioning of the mobile terminal 110. In some examples, the mobile terminal 110 even does not need to demodulate the SSB, and can even complete the transmission of the SRS without obtaining the SFN of a current SSB. That is, the mobile terminal 110 neither needs an existing protocol stack system, nor needs to maintain a plurality of connection statuses of the mobile terminal. In addition, because all network device side information is pre-configured, a synchronization flow of a cell search on a mobile terminal 110 physical layer is extremely simplified, no random-access process is required to acquire a TA, and downlink processing of the mobile terminal 110 physical layer may even not need to complete any demodulation. In such a case, a cost and power consumption of the mobile terminal 110 can be greatly reduced, and portability thereof can be greatly improved. The positioning system and the positioning method of the present disclosure can even support a disposable device.

Corresponding to the above positioning system 100 and the positioning method, some examples of the present disclosure further provide a positioning method executed by a mobile terminal. The method may include: parameters for determining a time-frequency resource of an SRS is acquired from the configuration information stored therein; the time-frequency resource for sending the SRS is determined according to the parameters for determining the time-frequency resource of the SRS; the SRS is sent, on the time-frequency resource, to a plurality of network devices, and a position of the mobile terminal is determined by the plurality of network devices and the location server according to the SRS.

In addition, some examples of the present disclosure further provide a positioning method executed by a network device. The method may include: an SRS is received from a mobile terminal; an arrival time of the SRS and a time-frequency resource occupied thereby are determined; an identifier of the mobile terminal sending the SRS is determined according to a pre-stored one-to-one correspondence between the time-frequency resource of the SRS and the identifier of the mobile terminal and the time-frequency resource occupied by the SRS; the arrival time of the SRS and the identifier of the mobile terminal sending the SRS are reported to the location server, and a position of the mobile terminal sending the above SRS is determined by the location server according to the arrival time of the SRS.

Figure 4:
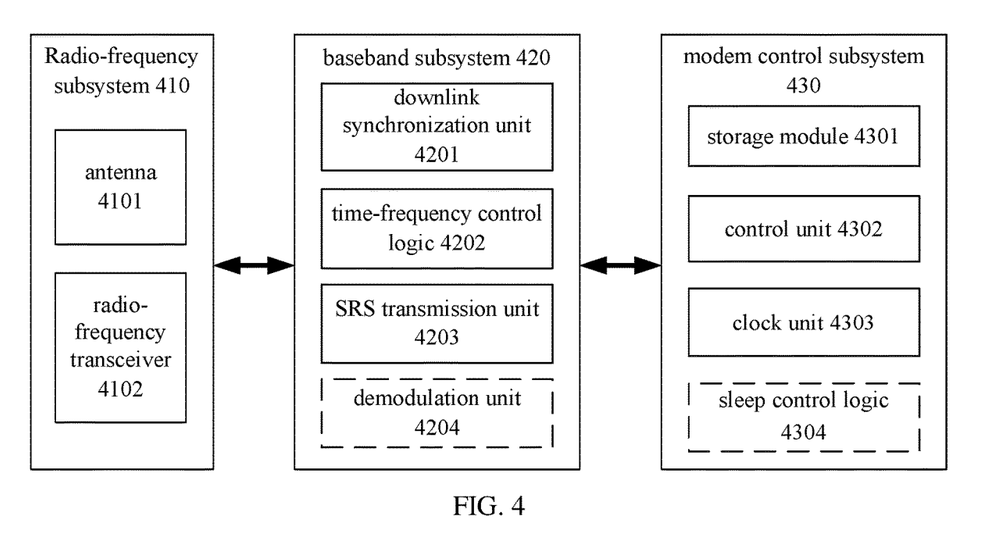
FIG. 4 shows an internal structure of a mobile terminal device for positioning described in some examples of the present disclosure.

Corresponding to the above positioning system 100 and the positioning method, some examples of the present disclosure further provide a mobile terminal. FIG. 4 shows an internal structure of a mobile terminal 400 described in the examples of the present disclosure. As shown in FIG. 4, the mobile terminal 400 described in the examples of the present disclosure includes: a radio-frequency subsystem 410, a baseband subsystem 420 and a modem control subsystem 430.

The above radio-frequency subsystem 410 may specifically include: an antenna 4101 and a radio-frequency transceiver 4102. The above antenna 4101 and the radio-frequency transceiver 4102 are mainly used for receiving and sending a radio-frequency signal.

The above baseband subsystem 420 may specifically include: a downlink synchronization unit 4201, a time-frequency control logic 4202 and an SRS transmission unit 4203. The above downlink synchronization unit 4201 is used for executing an initial cell search flow under control of the time-frequency control logic 4202, detecting downlink synchronization information in the radio-frequency signal received by the radio-frequency transceiver 4102, and completing synchronization with a network device 120 according to the received downlink synchronization information, so as to calculate an adjusting parameter of a frequency point and time of the above radio-frequency transceiver 4102. The above SRS transmission unit 4203 is used for sending an SRS through the above radio-frequency subsystem 410 under control of the time-frequency control logic 4202. The above time-frequency control logic 4202 is used for controlling a time of the downlink synchronization unit 4201 executing a simplified initial cell search flow, and can adjust a frequency and time deviation of the terminal according to an output of the downlink synchronization unit 4201. The above time-frequency control logic 4202 is further used for acquiring parameters for determining a time-frequency resource of the SRS from preset configuration information of the mobile terminal, determining the time-frequency resource used for sending the SRS, and controlling the time-frequency resource used by the SRS transmission unit 4203 for sending the SRS.

The above baseband subsystem 420 may further include: a demodulation unit 4204. The demodulation unit 4204 is mainly used for demodulating downlink broadcast channel data in the radio-frequency signal received by the radio-frequency transceiver 4102 to obtain an SFN.

The above modem control subsystem 430 may specifically include: a storage module 4301, a control unit 4302 and a clock unit 4303. The above storage module 4301 is used for storing the configuration information of the mobile terminal and a control logic for the above control unit 4302. The above control unit 4302 is used for controlling operation of the above baseband subsystem 420. The above clock unit 4303 is used for managing a local clock. In some examples of the present disclosure, the above modem control subsystem 430 may further include a sleep control logic 4304. The sleep control logic 4304 is used for controlling the mobile terminal to enter a sleep state after completing transmission of the SRS, and controlling the mobile terminal to wake up and enter an activated state before next transmission of the SRS. It should be noted that, the above storage module 4301 may include a random access memory (RAM), a static storage device, and a dynamic storage device. In addition, the above storage module 4301 should further include a non-volatile memory (NVM), used for storing preset cell parameters and codes. The above control unit 4302 may be achieved by means of a general central processing unit (CPU), a microcontroller unit (MCU), an application specific integrated circuit (ASIC), or one or more integrated circuits.

As can be seen from the structure of the above mobile terminal 400, the mobile terminal provided by the examples of the present disclosure has a very simple structure, so a cost thereof is very low, and a disposable device can be supported. Meanwhile, the mobile terminal provided by the examples of the present disclosure further has features of small volume, portability and easily adhering to a person, an article or a device. In addition, the mobile terminal further has an ultra-low power consumption, being capable of standing by for several days to several weeks, and even for several months by means of a disposable battery or a solar battery.

It should be understood by those of ordinary skill in art that the discussion of any of above embodiments is only exemplary and is not intended to imply that the scope of the present disclosure (including the claims) is limited to these examples. Under the spirit of the present disclosure, above embodiments or technical features in different embodiments may also be combined, steps may be implemented in any order, and there are many other variations of the different aspects of the disclosed embodiments as described above, which are not provided in detail for the sake of brevity.

Additionally, to simplify illustration and discussion, and in order not to obscure the embodiments of the present disclosure, well-known power/power sources associated with integrated circuit (IC) chips and other components may or may not be shown in the figures provided in the figures provided. ground connection. Furthermore, devices may be shown in block diagram form in order to avoid obscuring the disclosed embodiments, and this also takes into account the fact that details regarding the implementation of these block diagram devices are highly dependent on the implementation of the disclosed embodiments platform (i.e., these details should be well within the understanding of those skilled in art). Where specific details (e.g., circuits) are set forth to describe exemplary embodiments of the present disclosure, it will be apparent to those skilled in the art that the disclosed embodiments may be practiced without these specific details or with these specific details. Accordingly, these descriptions are to be regarded as illustrative rather than restrictive. Although the present disclosure has been described in conjunction with specific embodiments thereof, many alternatives, modifications, and variations to these embodiments will be apparent to those of ordinary skill in art from the foregoing description. For example, other memory architectures (e.g., dynamic RAM (DRAM)) may use the discussed embodiments.

The disclosed embodiments are intended to cover all such alternatives, modifications and variations that fall within the broad scope of appended claims. Therefore, any omission, modification, equivalent replacement, improvement, etc. made within the spirit and principle of the embodiments of the present disclosure should be included within the protection scope of the present disclosure.

What is claimed is:

1. A positioning method, comprising:
generating, according to configuration parameters of a plurality of network devices at a campus, configuration information of each mobile terminal in advance, and pre-storing the configuration information in a storage module of each mobile terminal; wherein the configuration information comprises: cell parameters, an identifier of each mobile terminal and parameters for determining a time-frequency resource of a sounding reference signal corresponding to the identifier of the mobile terminal;
synchronizing, by one mobile terminal, with one of the plurality of network devices according to the configuration information; acquiring the parameters for determining the time-frequency resource of the sounding reference signal from the configuration information; and determining the time-frequency resource for sending the sounding reference signal; and sending, on the time-frequency resource, the sounding reference signal to the plurality of network devices;
receiving, by each of the plurality of network devices, the sounding reference signal; determining an arrival time of the sounding reference signal and the time-frequency resource occupied by the sounding reference signal, determining, according to the time-frequency resource occupied by the sounding reference signal, an identifier of the mobile terminal sending the sounding reference signal, and reporting, to a location server, the arrival time of the sounding reference signal and the identifier of the mobile terminal sending the sounding reference signal; and
receiving, by the location server, the arrival time of the sounding reference signal and the identifier of the mobile terminal sending the sounding reference signal from the plurality of network devices, and determining a position of the mobile terminal sending the sounding reference signal according to the arrival time of the sounding reference signal.

2. The method according to claim 1, wherein the synchronizing, by one mobile terminal, with one of the plurality of network devices according to the configuration information comprises:
acquiring, by the mobile terminal, the cell parameters from the configuration information stored in its storage module, wherein the cell parameters comprise: a frequency point of a cell and an identifier of the cell;
executing, by the mobile terminal, a simplified initial cell search flow according to the cell parameters to obtain downlink synchronization information; and
adjusting, by the mobile terminal, a frequency shift and a timing parameter according to the downlink synchronization information.

3. The method according to claim 1, wherein the parameters for determining the time-frequency resource of the sounding reference signal comprise: a system frame number, a subframe, a slot, a symbol and a frequency;
the method further comprises: demodulating, by the mobile terminal, a physical broadcast channel in a system synchronization block to acquire a current system frame number;
determining the time-frequency resource for sending the sounding reference signal comprises: determining the time-frequency resource for sending the sounding reference signal according to the system frame number, the subframe, the slot, the symbol and the frequency that are comprised in the parameters for determining the time-frequency resource of the sounding reference signal in the configuration information.

4. The method according to claim 3, further comprising:
determining, by the mobile terminal, a moment of sending the sounding reference signal according to the time-frequency resource, and a waiting slot from a current moment to the moment of sending the sounding reference signal; and
in response to determining the waiting slot is greater than a preset threshold, controlling the mobile terminal to enter a sleep state, and before the moment of sending the sounding reference signal comes, controlling the mobile terminal to enter an activated state.

5. The method according to claim 1, wherein the parameters for determining the time-frequency resource of the sounding reference signal comprise: a subframe, a slot, a symbol and a frequency, wherein
determining the time-frequency resource for sending the sounding reference signal comprises: determining the time-frequency resource for sending the sounding reference signal according to the subframe, the slot, the symbol and the frequency that are comprised in the parameters for determining the time-frequency resource of the sounding reference signal in the configuration information.

6. The method according to claim 5, wherein the configuration information further comprises: an interframe space, wherein
determining the time-frequency resource for sending the sounding reference signal comprises: determining the time-frequency resource for sending the sounding reference signal according to the interframe space in the configuration information and the subframe, the slot, the symbol and the frequency that are comprised in the parameter for determining the time-frequency resource of the sounding reference signal.

7. The method according claim 3, further comprising: controlling the mobile terminal to enter the sleep state every time a transmission of the sounding reference signal is completed, and controlling the mobile terminal to enter an activated state before a moment of sending a next sounding reference signal comes.

8. The method according to claim 1, wherein determining, according to the time-frequency resource occupied by the sounding reference signal, an identifier of the mobile terminal sending the sounding reference signal comprises:
pre-storing, by each of the plurality of network devices, a one-to-one correspondence between the time-frequency resource of the sounding reference signal and the identifier of the mobile terminal; and
determining, by the network devices, the identifier of the mobile terminal sending the sounding reference signal according to the time-frequency resource occupied by the sounding reference signal and the one-to-one correspondence between the time-frequency resource of the sounding reference signal and the identifier of the mobile terminal.

9. The method according to claim 1, further comprising:
determining a quantity of mobile terminals in the campus and a period of sending the sounding reference signal;
determining a frequency mapping mode of the sounding reference signal and whether to send the sounding reference signal at intervals on a time domain; and
distributing, to each mobile terminal, a time-frequency resource of the sounding reference signal within the period for sending the sounding reference signal according to the frequency mapping mode and based on a result of whether to send the sounding reference signal at intervals on the time domain, so as to establish the one-to-one correspondence between the time-frequency resource of the sounding reference signal and the identifier of the mobile terminal.

10. The method according to claim 9, wherein determining a frequency mapping mode of the sounding reference signal and whether to send the sounding reference signal at intervals on a time domain comprises: determining the frequency mapping mode of the sounding reference signal and whether to send the sounding reference signal at intervals on the time domain according to the quantity of the mobile terminals and the period of the mobile terminal sending the sounding reference signal.

11. The method according to claim 9, wherein distributing, to the mobile terminal, a time-frequency resource of the sounding reference signal within a period of sending the sounding reference signal comprises: in response to determining to send the sounding reference signal at intervals on the time domain, selecting, at intervals on the time domain, a part of the time-frequency resource of the sounding reference signal within the period of sending the sounding reference signal to distribute to the mobile terminal.

12. The method according to claim 11, further comprising:
presetting a basic sequence of the sounding reference signal, wherein a length of the basic sequence of the sounding reference signal is a sum of a length of an orthogonal frequency-division multiplexing symbol and a maximum time advance preset by a system;
before sending the sounding reference signal to the plurality of network devices, estimating, by the mobile terminal, a time advance estimation TAe according to the cell parameters and a path loss; and intercepting data with the length of the orthogonal frequency-division multiplexing symbol from the TAe-th data of the basic sequence as a target sequence of the sounding reference signal to be sent.

13. The method according to claim 12, wherein the time advance estimation TAe uses a minimum possible value or an estimated average value.

14. A mobile terminal for positioning, comprising: a radio-frequency subsystem, a baseband subsystem and a modem control subsystem, wherein
the radio-frequency subsystem comprises: an antenna and a radio-frequency transceiver; wherein the antenna and the radio-frequency transceiver are used for receiving and transmitting a radio-frequency signal;
the baseband subsystem comprises: a downlink synchronization unit, a time-frequency control logic, and a sounding reference signal transmission unit; wherein the downlink synchronization unit is used for completing synchronization with a network device under a control of the time-frequency control logic to calculate an adjusting parameter of a frequency point and time of the radio-frequency transceiver; the sounding reference signal transmission unit is used for sending, under a control of the time-frequency control logic, a sounding reference signal via the radio-frequency subsystem; the time-frequency control logic is used for controlling a time of the downlink synchronization unit performing a simplified initial cell search flow, adjusting a frequency and time deviation of the mobile terminal and control the time-frequency resource for sending the sounding reference signal according to an output of the downlink synchronization unit; wherein,
each of a plurality of network devices receives the sounding reference signal, determines an arrival time of the sounding reference signal and the time-frequency resource occupied by the sounding reference signal, determines, according to the time-frequency resource occupied by the sounding reference signal, an identifier of the mobile terminal sending the sounding reference signal, and reports, to a location server, the arrival time of the sounding reference signal and the identifier of the mobile terminal sending the sounding reference signal; and the location server receives the arrival time of the sounding reference signal and the identifier of the mobile terminal sending the sounding reference signal from the plurality of network devices, and determines a position of the mobile terminal sending the sounding reference signal according to the arrival time of the sounding reference signal;
the modem control subsystem comprises: a storage module, a control unit and a clock unit, wherein the storage module is used for storing configuration information of the mobile terminal and a control logic for the control unit; the control unit is used for controlling operation of the baseband subsystem; and the clock unit is used for managing a local clock; wherein,
the configuration information of each mobile terminal is generated according to configuration parameters of the plurality of network devices at a campus in advance and the configuration information comprises: cell parameters, an identifier of each mobile terminal and parameters for determining a time-frequency resource of the sounding reference signal corresponding to the identifier of the mobile terminal.

15. The mobile terminal according to claim 14, wherein the modem control subsystem further comprises a sleep control logic for controlling the mobile terminal to enter a sleep state after completing transmission of the sounding reference signal, and controlling the mobile terminal to enter an activated state before next transmission of the sounding reference signal.

16. The mobile terminal according to claim 14, wherein the baseband subsystem further comprises a demodulation unit for demodulating downlink broadcast channel data in a radio-frequency signal received by the radio-frequency transceiver to obtain a system frame number.

17. A positioning system, comprising:
at least one mobile terminal according to claim 14, a plurality of network devices and a location server connected to the plurality of network devices, wherein
each of the plurality of network devices is to receive a sounding reference signal, determine an arrival time of the sounding reference signal, determine, according to a time-frequency resource occupied by the sounding reference signal, an identifier of the mobile terminal sending the sounding reference signal, and reporting, to the location server, the arrival time of the sounding reference signal and the identifier of the mobile terminal sending the sounding reference signal;
the location server is to receive the arrival time of each sounding reference signal and the identifier of the mobile terminal sending the sounding reference signal from the plurality of network devices, and determining a position of the mobile terminal sending the above sounding reference signal according to the arrival time of a certain sounding reference signal reaching the different network devices.

\* \* \* \* \*